(12) United States Patent
Liu

(10) Patent No.: US 9,579,853 B2
(45) Date of Patent: Feb. 28, 2017

(54) METHOD FOR MAKING A MOLDED COMPOSITE ARTICLE

(71) Applicant: ADVANCED INTERNATIONAL MULTITECH CO., LTD., Kaohsiung (TW)

(72) Inventor: Chih-Lung Liu, Kaohsiung (TW)

(73) Assignee: ADVANCED INTERNATIONAL MULTITECH CO., LTD., Kaohsiung (TW)

(*) Notice: Subject to any disclaimer, the term of this patent is extended or adjusted under 35 U.S.C. 154(b) by 384 days.

(21) Appl. No.: 14/504,840

(22) Filed: Oct. 2, 2014

(65) Prior Publication Data

US 2015/0097313 A1 Apr. 9, 2015

(30) Foreign Application Priority Data

Oct. 7, 2013 (TW) .............. 102136189 A

(51) Int. Cl.
*B29C 70/46* (2006.01)
*B29C 51/08* (2006.01)
*B29C 51/12* (2006.01)
*B29C 51/14* (2006.01)
*B29K 101/10* (2006.01)
*B29K 105/08* (2006.01)
*B29L 31/34* (2006.01)
*B29K 307/04* (2006.01)
*B29K 309/08* (2006.01)
(Continued)

(52) U.S. Cl.
CPC ............. *B29C 70/46* (2013.01); *B29C 51/085* (2013.01); *B29C 51/12* (2013.01); *B29C 51/14* (2013.01); *B29C 51/145* (2013.01); *B29C 70/462* (2013.01); *B29C 70/543* (2013.01); *B29C 70/545* (2013.01); *B29C 2043/3261* (2013.01); *B29K 2101/10* (2013.01); *B29K 2105/0872* (2013.01); *B29K 2307/04* (2013.01); *B29K 2309/08* (2013.01); *B29L 2031/3481* (2013.01)

(58) Field of Classification Search
CPC ........ B29C 51/085; B29C 51/12; B29C 51/14; B29C 51/145; B29C 2043/3261; B29C 70/46; B29C 70/462
See application file for complete search history.

(56) References Cited

U.S. PATENT DOCUMENTS 4,167,430 A * 9/1979 Arachi .................... B29C 43/32
156/212
5,190,773 A * 3/1993 Damon .................. B29C 43/32
156/232
(Continued)

*Primary Examiner* — Benjamin Schiffman
(74) *Attorney, Agent, or Firm* — Hunton & Williams LLP

(57) ABSTRACT

A method for making a molded composite article includes the steps of: providing a sleeve body on a pressing portion of a male mold body, the sleeve body being made of a heat-expansible material and having a primary engaging segment and an abutting segment; disposing a composite laminate material on a female mold body; moving the male mold body provided with the sleeve body toward the female mold body while the male mold body and the female mold body are heated; continuing to move the male mold body so that the pressing portion extends into the abutting segment and presses the composite laminate material to form the molded composite article; and separating the male mold body from the female mold body and removing the molded composite article.

8 Claims, 7 Drawing Sheets

(51) Int. Cl.
 *B29C 43/32* (2006.01)
 *B29C 70/54* (2006.01)

(56) References Cited

U.S. PATENT DOCUMENTS

| | | | | |
|---|---|---|---|---|
| 5,560,883 | A * | 10/1996 | Lane | B28B 19/0023 |
| | | | | 216/52 |
| 6,174,484 | B1 * | 1/2001 | Thompson | B29C 33/3828 |
| | | | | 249/142 |
| 7,588,655 | B2 * | 9/2009 | Pham | B29C 43/12 |
| | | | | 156/227 |
| 8,480,823 | B1 * | 7/2013 | Matsen | B21D 37/16 |
| | | | | 148/574 |
| 9,248,586 | B2 * | 2/2016 | Perrier | B29C 33/485 |
| 2006/0108055 | A1 * | 5/2006 | Pham | B29C 43/12 |
| | | | | 156/216 |
| 2008/0116334 | A1 * | 5/2008 | Xie | B29C 70/46 |
| | | | | 248/205.1 |
| 2011/0017385 | A1 * | 1/2011 | Liu | B29C 33/424 |
| | | | | 156/196 |
| 2011/0262575 | A1 * | 10/2011 | Matsen | B21D 37/16 |
| | | | | 425/174.8 R |
| 2012/0007282 | A1 * | 1/2012 | Liu | B29C 70/46 |
| | | | | 264/320 |
| 2013/0299672 | A1 * | 11/2013 | Perrier | B29C 33/485 |
| | | | | 249/114.1 |

* cited by examiner

METHOD FOR MAKING A MOLDED COMPOSITE ARTICLE

CROSS-REFERENCE TO RELATED APPLICATION

This application claims priority of Taiwanese Application No. 102136189, filed on Oct. 7, 2013.

FIELD OF THE INVENTION

The invention relates to a method for making an article, more particularly to a method for making a molded composite article.

BACKGROUND OF THE INVENTION

With the development of various electronic communication products, the production of the housing for the electronic communication products is now the focus of much attention. Composite materials added with various fibers, such as glass fibers, carbon fibers, or the like, have been used as materials for the housings of the electronic communication products in view of their good performances in weight, mechanical strength, plasticity, moisture resistance, and corrosion resistance.

Referring to FIG. 1, Taiwanese Patent No. I327959 discloses a method for manufacturing a case 1 with woven fiber texture by thermal compression. A plurality of woven fabrics 11 impregnated with thermosetting resin are laminated to form a laminate having a predetermined thickness. The laminate is cut into predetermined shape and size. A mold used in the method includes a female mold part 21 formed with a mold cavity 211 and a male mold part 22 formed with a protruding block 221. The cut laminate is disposed between the female mold part 21 and the male mold part 22. When the female mold part 21 and the male mold part 22 are pressed toward each other, the case 1 having a plurality of lead angles 111 is obtained.

In the aforesaid method, a large amount of resistance may be produced when the protruding block 221 is pressed toward the mold cavity 211 during the thermal compression. The laminate of woven fabrics 11 may not be pressed completely against the female mold part 21, and the case 1 thus formed may have crimp defects as shown in FIG. 2.

Although the aforesaid defect may be alleviated by increasing size of the protruding block 221, the male and female mold parts 22, 21 may not be separated from each other easily when the case 1 formed by the thermal compression is intended to be removed from the mold.

Referring to FIG. 3, Taiwanese Publication No. 375568 discloses a method for making a housing for an electrical device capable of preventing electromagnetic interference. In the method, a plastic plate 4 is compression molded using a mold 3. The mold 3 has a molding space 31 and two vent lines 32 gas-communicated with the molding space 31. The plastic plate 4 is placed in the mold 3 between the vent lines 32. Different gas pressures are applied from the vent lines 32. The plastic plate 4 is thus pressed in the directions shown by arrows due to the pressure difference between the gas pressures applied by the vent lines 32 to abut against a bottom inner surface of the mold 3 to obtain the housing formed with lead angles 41.

However, the pressure difference between the gas pressures applied from the vent lines 32 is not easily controlled. The lead angles 41 of the housing thus formed are still unsatisfactory. Additionally, the thickness of the housing thus formed may be not even.

SUMMARY OF THE INVENTION

Therefore, the object of the present invention is to provide a method for making a molded composite article at a higher yield rate.

The method for making a molded composite article according to this invention includes the steps of: a) providing a sleeve body on a pressing portion of a male mold body, the sleeve body being made of a heat-expansible material and having a primary engaging segment sleeved around the pressing portion and an abutting segment extending co-axially from the primary engaging segment and away from a pressing end surface of the pressing portion; b) disposing a composite laminate material on a female mold body to span an open side of a molding space of the female mold body, the female mold body having a bottom wall and a side wall that cooperate to define the molding space; c) moving the male mold body provided with the sleeve body toward the female mold body while the male mold body and the female mold body are heated so as to force the composite laminate material, into the molding space and so as to cause the sleeve body to expand so that the abutting segment forces the composite laminate material to abut against the female mold body at a corner of the bottom wall and the side wall; d) continuing to move the male mold body so that the pressing portion extends into the abutting segment and that the pressing end surface presses the composite laminate material directly against the bottom wall of the female mold body to form the composite laminate material into the molded composite article; and e) separating the male mold body from the female mold body and removing the molded composite article from the molding space of the female mold body.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE EMBODIMENT

Figure 1:
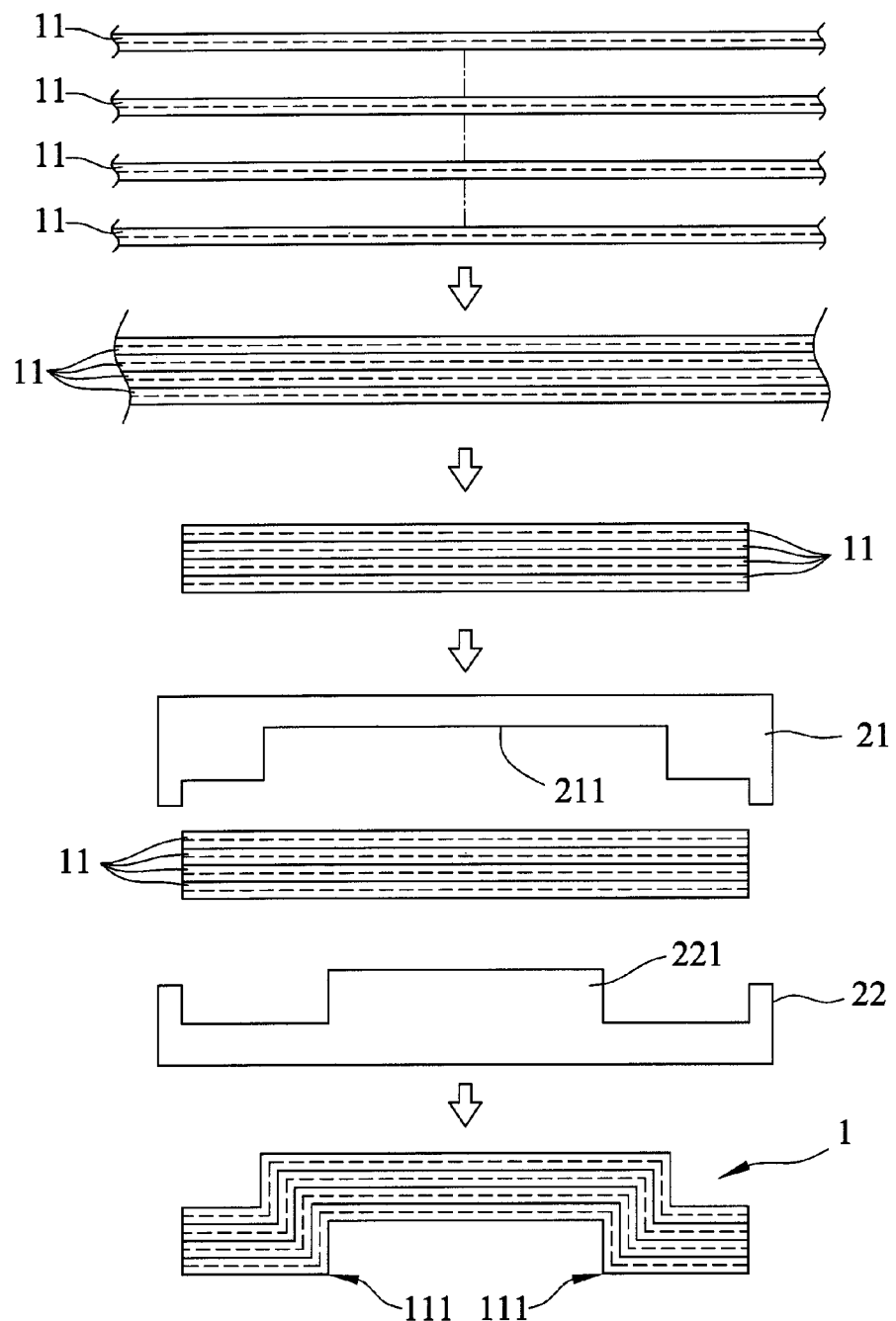
FIG. 1 is a schematic view showing consecutive steps of a method for manufacturing a case with woven fiber texture disclosed in Taiwanese Patent No. I327959.
Figure 2:
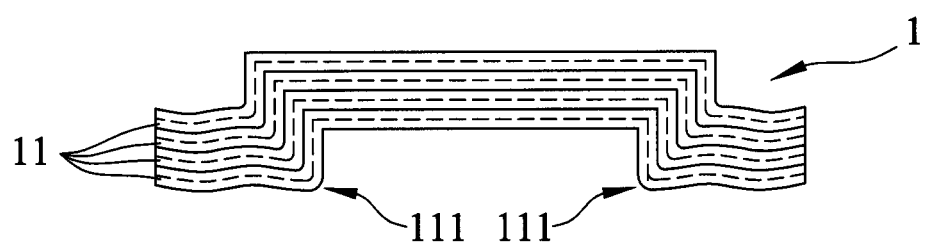
FIG. 2 is a schematic view showing defects that may be formed in the case made by the method of Taiwanese Patent No. I327959.
Figure 3:
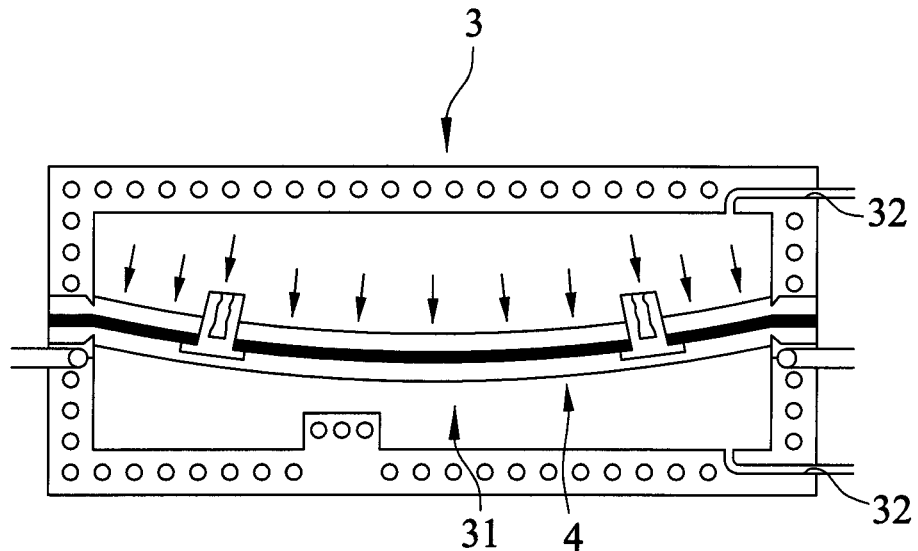
FIGS. 3 and 4 are schematic views showing consecutive steps of a method for making a housing for an electrical device disclosed in Taiwanese Publication No. 375568.
Figure 4:
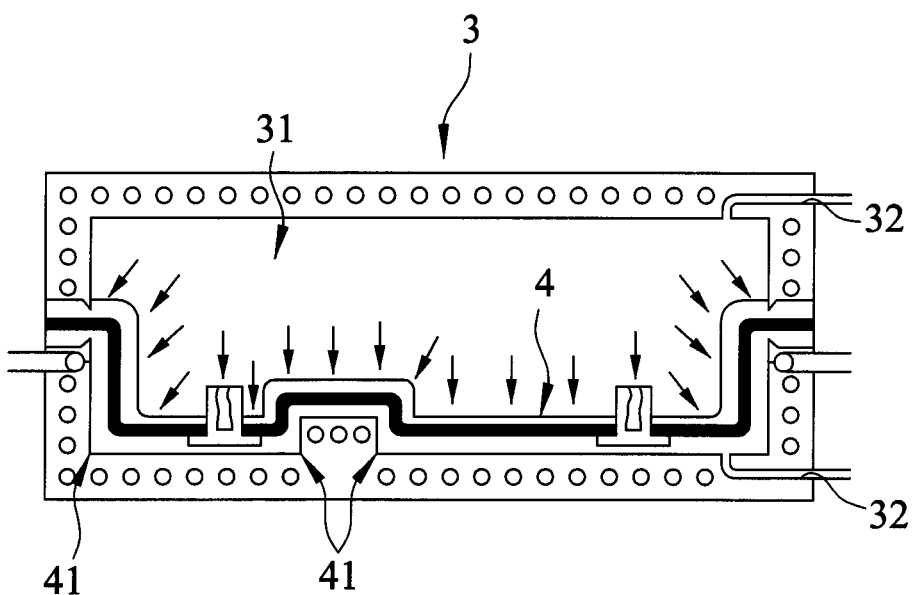
Figure 5:
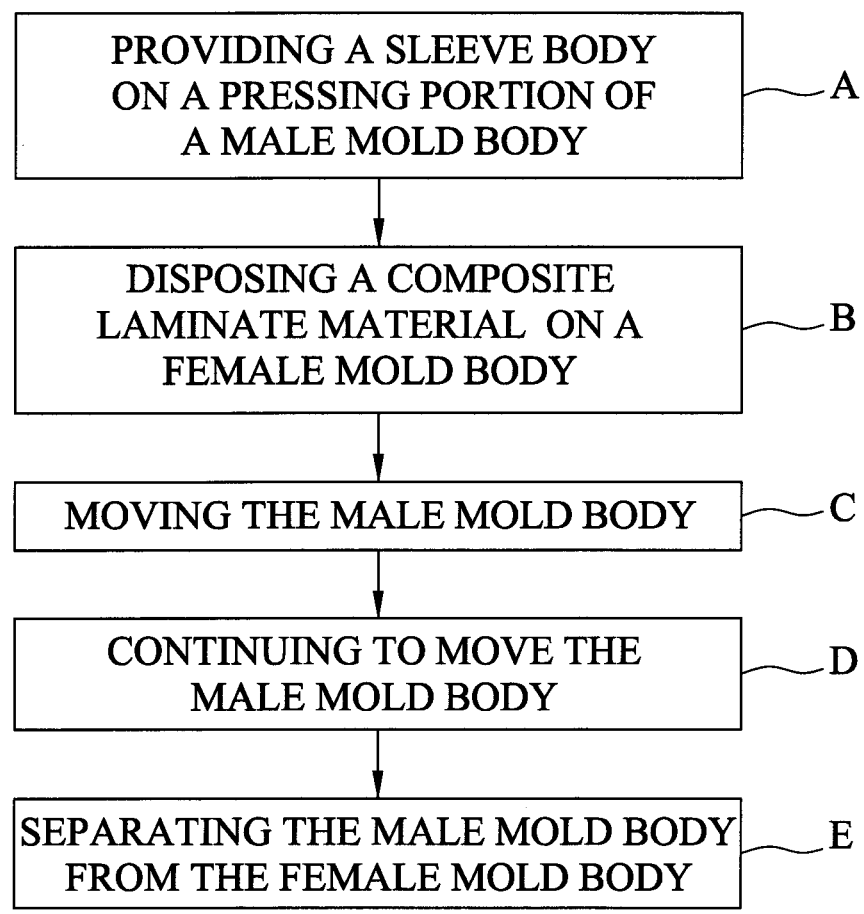
FIG. 5 is a flow chart of an embodiment of a method for making a molded composite article according to this invention.
Figure 6:
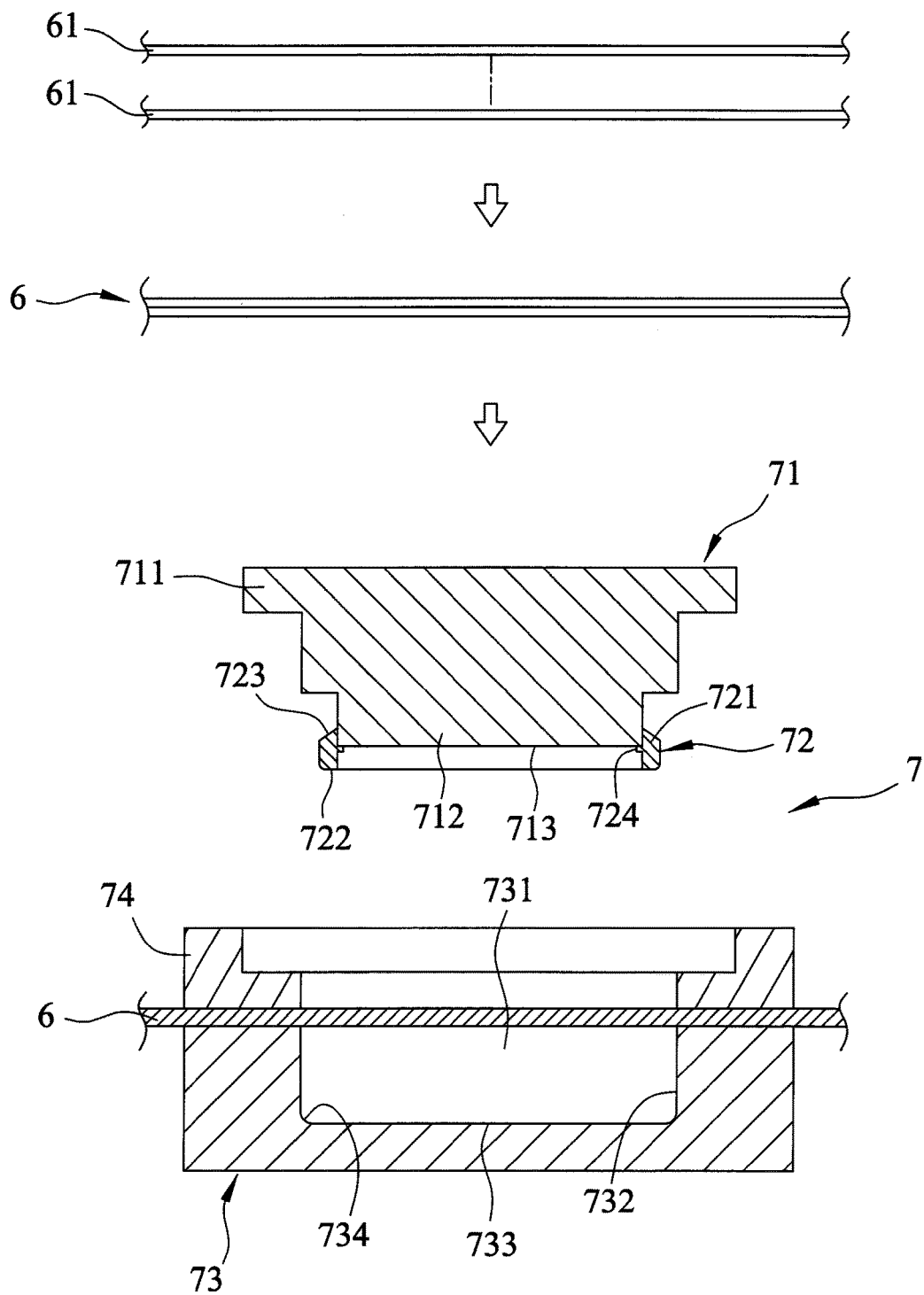
FIGS. 6 and 7 are schematic sectional views showing consecutive steps of the embodiment.
Figure 7:
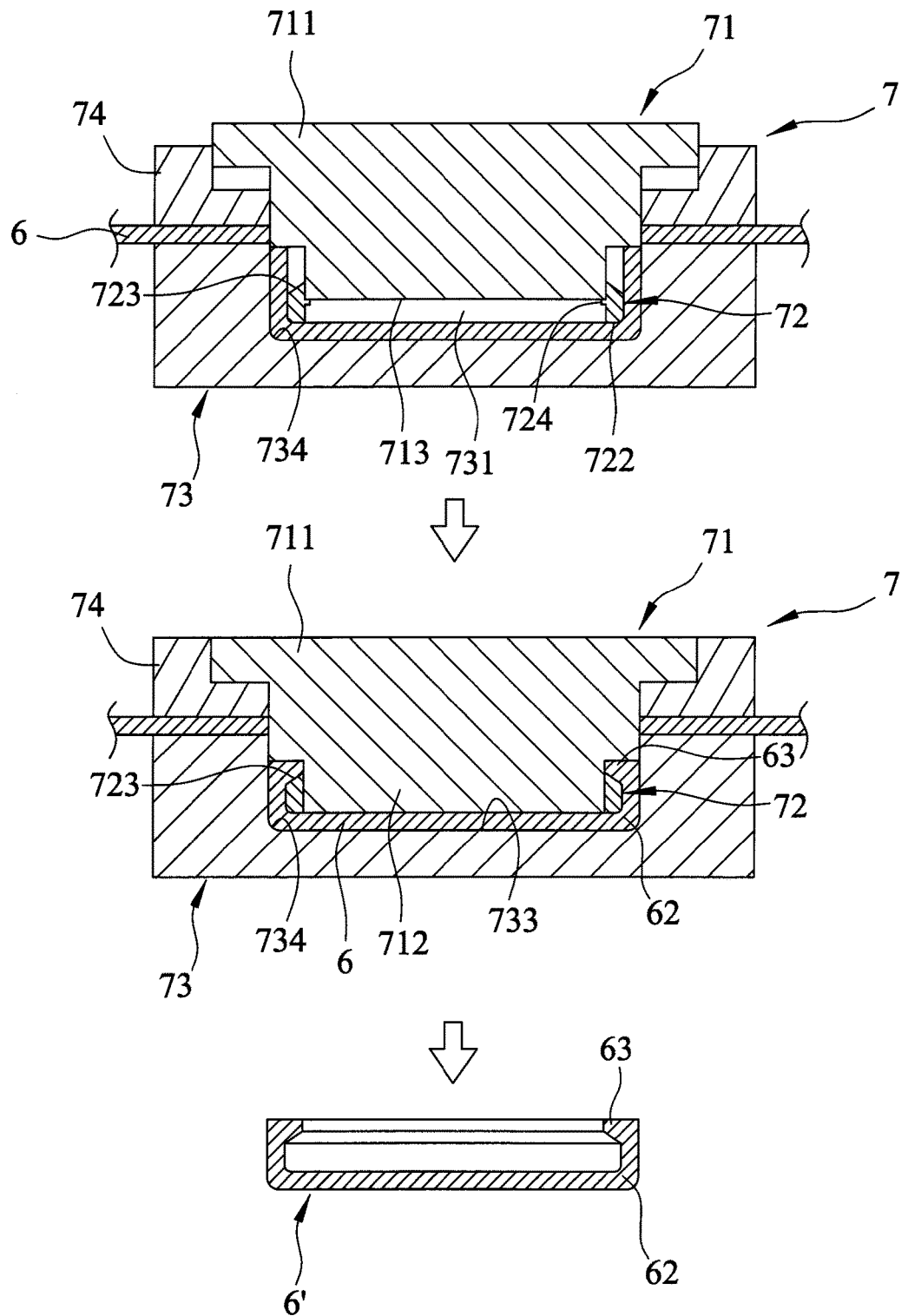
Figure 8:
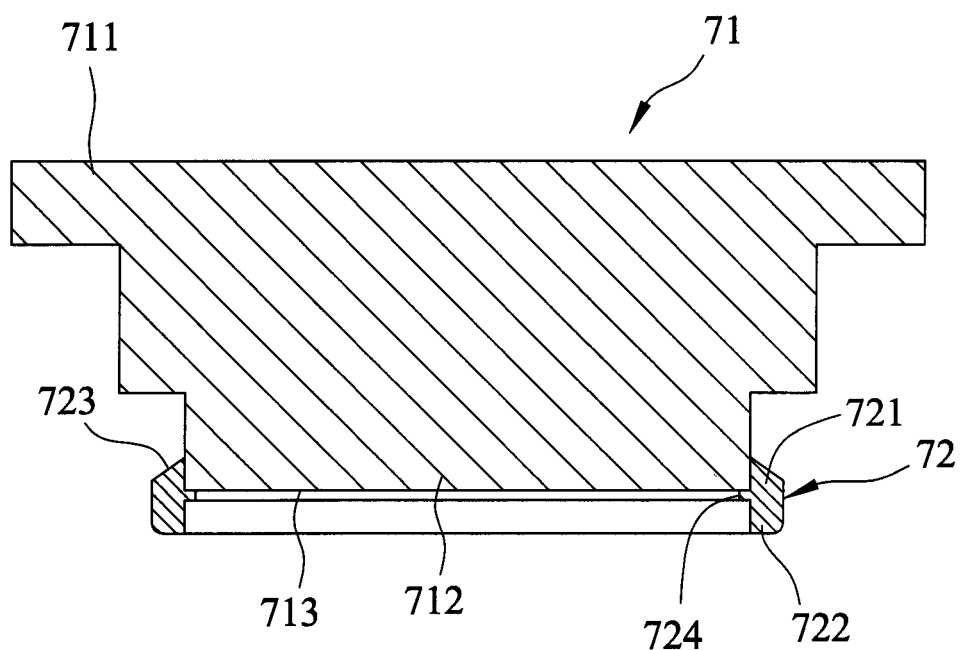
FIG. 8 is a sectional view showing a male mold body sleeved with a sleeve body used in the embodiment.

Referring to FIGS. 5 to 8, the embodiment of the method for making a molded composite article according to this invention includes the steps of:

A) Providing a Sleeve Body 72 on a Pressing Portion 712 of a Male Mold Body 71:

A mold 7 used in the method of the embodiment includes the male mold body 71 and a female mold body 73. The sleeve body 72 is provided on the pressing portion 712 of the male mold body 71. The sleeve body 72 is made of a heat-expansible material which is preferably selected from plastic, rubber, and the combination thereof, and has a primary engaging segment 721 sleeved around the pressing portion 712 and an abutting segment 722 extending co-axially from the primary engaging segment 721 and away from a pressing end surface 713 of the pressing portion 712.

The sleeve body 72 further has an inwardly projecting flange portion 724 that is provided between the primary engaging segment 721 and the abutting segment 722 and that abuts against the pressing end surface 713 of the pressing portion 712.

The male mold body 71 further has a head portion 711 opposite to the pressing end surface 713. The head portion 711 has a cross-section wider than that of the pressing portion 712. The primary engaging segment 721 of the sleeve body 72 has an inclined end surface 723 that is spaced apart from and faces toward the head portion 711 of the male mold body 71 so as to form a rim-forming space therebetween.

The mold 7 further includes a holding member 74 disposed adjacent to an open side of a molding space 731 of the female mold body 73. The female mold body 73 has a bottom wall 733 and a side wall 732 that cooperate to define the molding space 731.

B) Disposing a Composite Laminate Material 6 on the Female Mold Body 73:

The composite laminate material 6 is a laminate of prepregs 61 which are formed by impregnating a matrix with a thermosetting resin. The matrix is selected from the group consisting of a glass fiber matrix, a carbon fiber matrix, and a matrix of glass fibers and carbon fibers.

The composite laminate material 6 is disposed on the female mold body 73 to span the open side of the molding space 731 of the female mold body 73. The holding member 74 holds a peripheral part of the composite laminate material 6 between the holding member 74 and the female mold body 73.

C) Moving the Male Mold Body 71:

The male mold body 71 provided with the sleeve body 72 is moved toward the female mold body 73 while heating the male mold body 71 and the female mold body 73 so as to force the composite laminate material 6 into the molding space 731 and so as to cause the sleeve body 72 to expand so that the abutting segment 722 forces the composite laminate material 6 to abut against the female mold body 73 at a corner 734 of the bottom wall 733 and the side wall 732. The corner 734 maybe a rounded corner, and the abutting segment 722 may have a rounded contour conforming to that of the corner 734.

The male mold body 71 and the female mold body 73 are heated via high-frequency heating. The heating temperature depends on the composite laminate material 6, and is generally up to 135° C.

D) Continuing to Move the Male Mold Body 71:

Moving of the male mold body 71 is continued so that the pressing portion 712 is moved past the flange portion 724 and extends into the abutting segment 722 and that the pressing end surface 713 presses the composite laminate material 6 directly against the bottom wall 733 of the female mold body 73 to form the composite laminate material 6 into the molded composite article 6'. A radial inward rim part 63 of the molded composite article 6' is formed in the rim-forming space and has a profile defined by the head portion 711 of the male mold body 71 and the inclined end surface 723 of the primary engaging segment 721 of the sleeve body 72. The molded composite article 6' is also formed with a lead angle 62 defined by the corner 734 of the female mold body 73.

E) Separating the Male Mold Body 71 from the Female Mold Body 73:

The male mold body 71 is separated from the female mold body 73, and the molded composite article 6' is removed from the molding space 731 of the female mold body 73. Since the sleeve body 72 is made of a heat-expansible material and is formed with the inclined end surface 723, the sleeve body 72 can be compressed when the male mold body 71 is moved away from the female mold body 73, the male mold body 71 can be easily separated from the female mold body 73, and the sleeve body 72 can be easily removed from the molded composite article 6'.

In view of the aforesaid, the method for making a molded composite article according to this invention has the following advantages:

(1) Since the sleeve body 72 is made of a heat-expansible material, the sleeve body 72 expands while the male mold body 71 and the female mold body 73 are heated so that the abutting segment 722 forces the composite laminate material 6 to abut against the female mold body 73 at a corner 734 of the bottom wall 733 and the side wall 732. The molded composite article 6' thus formed has a lead angle 62 without the defects encountered in the aforementioned prior art.

(2) The lead angle 62 and the radial inward rim part 63 of the molded composite article 6' can be formed at the same time using the male mold body 71 provided with the sleeve body 72. Therefore, the processing procedure is simplified.

(3) Since the sleeve body 72 is made of a heat-expansible material and is formed with the inclined end surface 723, the sleeve body 72 can be compressed when the male mold body 71 is moved away from the female mold body 73, the male mold body 71 can be easily separated from the female mold body 73, and the sleeve body 72 can be easily removed from the molded composite article 6'.

(4) The lead angle 62 and the radial inward rim part 63 of the molded composite article 6' can be formed with profiles different from those illustrated in this embodiment by changing the sleeve body 72 with another sleeve body having a different configuration.

While the present invention has been described in connection with what are considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for making a molded composite article, comprising the steps of:
   a) providing a sleeve body on a pressing portion of a male mold body, the sleeve body being made of a heat-expansible material and having a primary engaging segment sleeved around the pressing portion and an abutting segment extending co-axially from the primary engaging segment and away from a pressing end surface of the pressing portion;
   b) disposing a composite laminate material on a female mold body to span an open side of a molding space of the female mold body, the female mold body having a bottom wall and a side wall that cooperate to define the molding space;

c) moving the male mold body provided with the sleeve body toward the female mold body while the male mold body and the female mold body are heated so as to force the composite laminate material into the molding space and so as to cause the sleeve body to expand so that the abutting segment forces the composite laminate material to abut against the female mold body at a corner of the bottom wall and the side wall;

d) continuing to move the male mold body so that the pressing portion extends into the abutting segment and that the pressing end surface presses the composite laminate material directly against the bottom wall of the female mold body to form the composite laminate material into the molded composite article; and e) separating the male mold body from the female mold body and removing the molded composite article from the molding space of the female mold body.

2. The method according to claim 1, wherein the male mold body further has a head portion opposite to the pressing end surface, the head portion having a cross-section wider than that of the pressing portion, the primary engaging segment of the sleeve body having an inclined end surface that is spaced apart from and faces toward the head portion of the male mold body so as to form a rim-forming space therebetween, and wherein, in step d), a radial inward rim part of the molded composite article is formed in the rim-forming space and has a profile defined by the head portion of the male mold body and the inclined end surface of the primary engaging segment of the sleeve body.

3. The method according to claim 1, wherein in step a), the sleeve body further has an inwardly projecting flange portion that is provided between the primary engaging segment and the abutting segment and that abuts against the pressing end surface of the pressing portion, and in step d), the pressing portion is moved past the flange portion and through the abutting segment to enable the pressing end surface to press the composite laminate material directly against the bottom wall of the female mold body.

4. The method according to claim 1, wherein the mold further includes a holding member disposed adjacent to the open side of the molding space of the female mold body for holding a peripheral part of the composite laminate material between the holding member and the female mold body.

5. The method according to claim 1, wherein the heat-expansible material is selected from the group consisting of plastic, rubber, and the combination thereof.

6. The method according to claim 1, wherein the male mold body and the female mold body are heated via high-frequency heating.

7. The method according to claim 1, wherein the composite laminate material is a laminate of prepregs which are formed by impregnating a matrix with a thermosetting resin.

8. The method according to claim 7, wherein the matrix is selected from the group consisting of a glass fiber matrix, a carbon fiber matrix, and a matrix of glass fibers and carbon fibers.

\* \* \* \* \*